Aug. 24, 1937.  E. M. SHIEPE  2,091,109
APPARATUS FOR THE MEASUREMENT OF TUNED CIRCUIT COMPONENTS
Filed Sept. 20, 1934  2 Sheets-Sheet 1
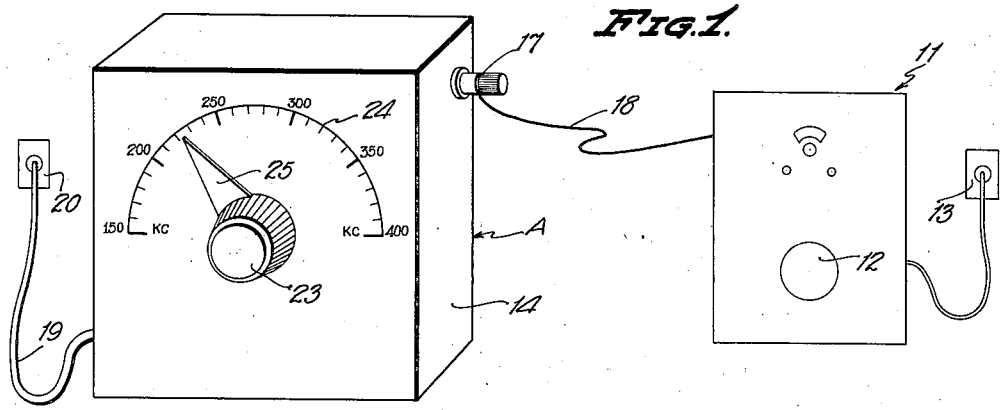
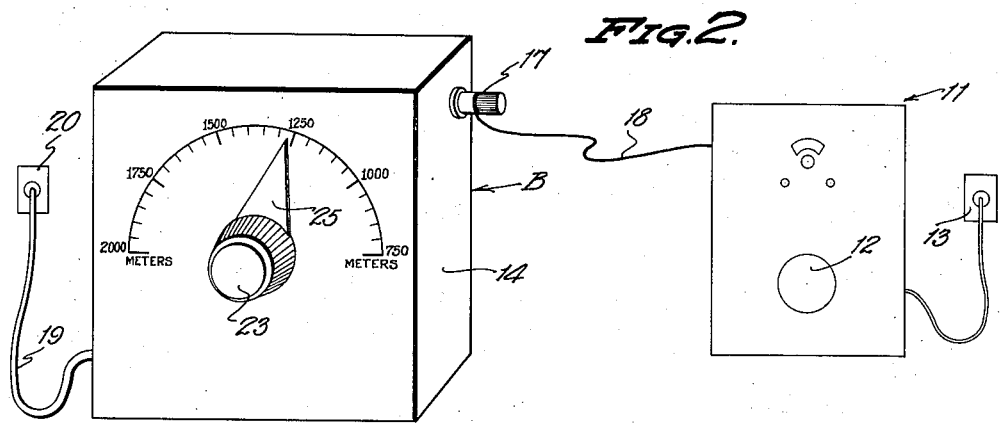
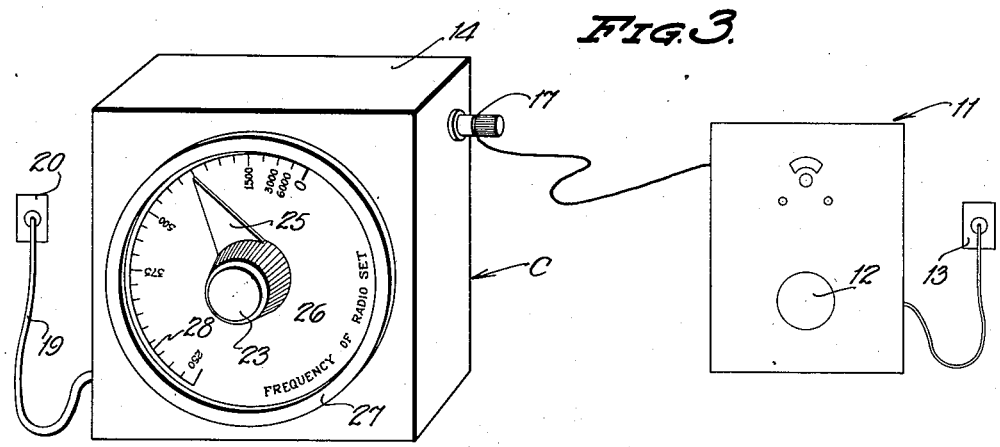
INVENTOR.
EDWARD M. SHIEPE.
BY
ATTORNEYS
WITNESS:

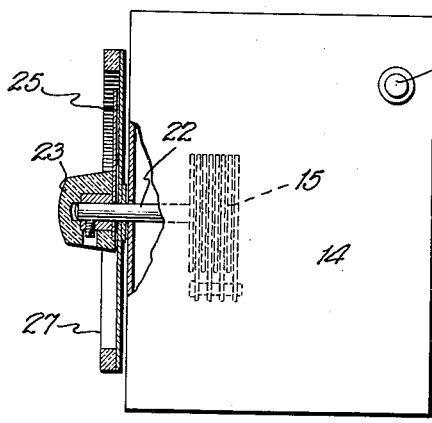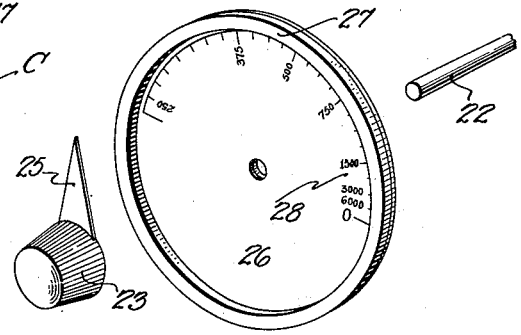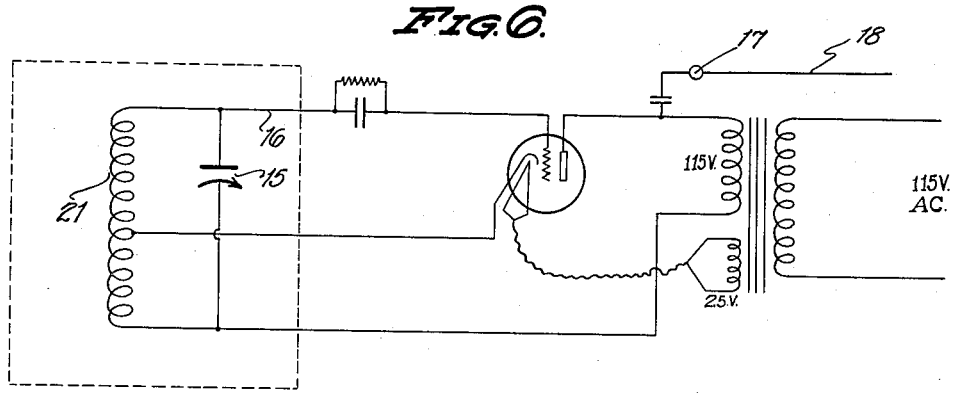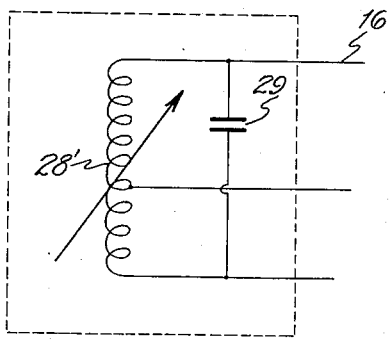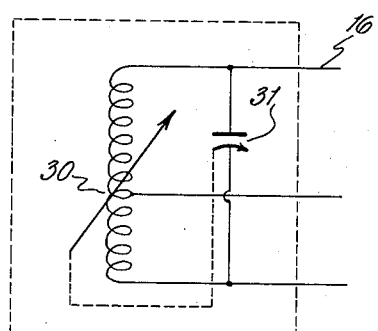

Patented Aug. 24, 1937

2,091,109

UNITED STATES PATENT OFFICE 2,091,109

APPARATUS FOR THE MEASUREMENT OF TUNED CIRCUIT COMPONENTS

Edward M. Shiepe, New York, N. Y.

Application September 20, 1934, Serial No. 744,785

8 Claims. (Cl. 250—39)

This invention relates to improvements in radio station finders, and more particularly to apparatus and/or method for the measurement of the natural frequency of a tuned radio circuit, and for the measurement of inductance and of capacity.

One of the several features of this invention resides in the use of a calibrated electrical oscillator of variable frequency having harmonics, the order of which need never be known in the use of the device or method in determining the natural unknown frequency of a tuned radio circuit. The natural frequency of a tuned circuit may be obtained by simple mathematics after two successive readings have been noted upon the calibrated dial, the readings being determined by two successive oscillator frequencies which produce audible or visible responses in the sound reproducer of the radio instrument with which the oscillator instrument is operatively connected.

Another feature of the invention is to provide a radio station finder of the above mentioned type in which the dial of the oscillator is calibrated in terms of frequency or wave length of the radio set to enable a user unskilled in the art to accurately and rapidly determine the frequency or wave length of the tuned radio receiving circuit. Such an instrument will be found useful by amateurs as well as skilled radio operators in determining the frequency or wave length of a radio broadcasting station when the call letters of the radio station are periodically given at relatively long intervals of time, or when the call letters are not clearly received.

Other objects will appear as the following specification is read in conjunction with the accompanying drawings, in which, Figure 1 is a perspective elevational view of one form of the invention.

Figure 2 is a view similar to Figure 1 of another form of the invention.

Figure 3 is a similar view of the preferred embodiment of the invention.

Figure 4 is a side elevational view partly in section of the station finder per se.

Figure 5 is a collective perspective view of the manipulating parts of the oscillator in separated position.

Figure 6 is a diagrammatic view of the oscillator circuit used in the form of oscillator shown in Figures 3 to 5.

Figures 7 and 8 are diagrammatic views of respective modifications.

Referring to the drawings by reference characters, the numeral 11 in all forms designates a radio receiving apparatus which includes any type of receiving circuit (not shown). The receiving circuit may be tuned by the manipulation of the control instruments of the receiver in the usual manner to tune in various radio broadcasting stations, and the purpose of the instrument about to be described is to determine the unknown frequency or wave length to which the circuit is tuned. The radio receiver includes the usual sound reproducer 12 and is electrically connected to a source of electric power such as an electric outlet 13.

In Figures 1 to 4, inclusive, I have shown three different forms of the invention. In Figure 1 the station finder or electrical oscillator is designated in its entirety by the letter A; in Figure 2 by the letter B, and in Figures 3 and 4 by the letter C.

The oscillators A, B and C, are substantially the same in construction with modifications as to dial calibrations and variable parameters, and a description of the features which they have in common will now be given, and like reference characters refer to similar parts throughout.

The oscillators, A, B, and C, each include a box-like casing 14 which houses a variable condenser 15 arranged in an electric circuit 16 which is operatively connected with the detector of the radio receiving apparatus by a binding post 17 and connecting wire 18. A cord 19 leads from the casing 14 to an electric outlet 20 unless the instrument is made to operate from batteries as a source of power. The circuit 16 shown in Figure 6 is of a standard type known as the "Hartley Circuit" whose tapped inductance is 21. The variable condenser is so mounted within the casing 14 that its shaft 22 extends through the front panel or wall of the casing and has a manipulating knob 23 fixedly attached thereto. By turning the knob 23, the movable plates of the condenser may be adjusted relative to the stationary plates to vary the capacity of the condenser.

In Figure 1 of the drawings, I have illustrated upon the front of the casing 14, a graduated semicircular shaped dial 24 calibrated in kilocycles (kc.) the range or band extending from 150 to 400 reading from left to right. The graduations of the dial are disposed radially with respect to the axis of the shaft 22 and fixed to the shaft or knob is an indicating pointer 25 adapted to traverse the dial 24.

In the operation of the oscillator A shown in Figure 1, assume that it is desired to find the natural frequency F of the detector or tuned circuit of the radio receiver 11, the operator having no knowledge of its components of inductance and capacity. For example, assume that the detector or tuned circuit is tuned to 760 kilocycles; thus F equals 760 kc. As the frequency of the oscillator A is varied from 400 to 150 kc., the oscillator will cause audible responses in the tuned circuit reproduced by the loud speaker 12 at readings of 380, 253⅓, 190 and at 152 kc. on the dial 24 as the knob 23 is turned from right to left with the pointer 25 normally at 400. These numbers are obtained by dividing 760 successively by the whole numbers 2, 3, 4 and 5. Thus, the 5th harmonic of 152 is 760, the 4th harmonic of 190 is 760, the 3rd harmonic of 253⅓ is 760, and the 2nd harmonic of 380 is 760.

With reference to the above example, we proceed to the exact analysis, let F be the frequency to which the set is tuned and let $F_1$ and $F_2$ be any two oscillator frequencies which give responses in the set. Also let $n$ be the order of harmonic of $F_1$ causing the response, and $(n-N)$ be the order of harmonic of $F_2$ causing its response. This assumes that $F_2$ is a higher frequency than $F_1$ since its harmonic order is lower. $n$ and $N$ are whole numbers and N is the number of responses away from the $n$ response. Then $$n = \frac{F}{F_1} \quad (1)$$

and $$(n-N) = \frac{F}{F_2}$$

or $$n = \frac{F}{F_2} + N \quad (2)$$

Equating (1) and (2):

$$\frac{F}{F_1} = \frac{F}{F_2} + N$$

Dividing through by F:

$$\frac{1}{F_1} = \frac{1}{F_2} + \frac{N}{F}$$

from which $$F = N \frac{F_2 F_1}{(F_2 - F_1)} \quad (3)$$

To clarify the method, let us apply Formula (3) to the preceding example in which $F = 760$ kc. Taking the first two sub-harmonics, $N=1$ and the formula reads $$F = 1 \times \frac{380 \times 253\tfrac{1}{3}}{(380 - 253\tfrac{1}{3})} = \frac{96,266\tfrac{2}{3}}{126\tfrac{2}{3}} = 760 \text{ kc.}$$

If the first and fourth sub-harmonics had been used, we would have had $$F = 3 \times \frac{380 \times 152}{(380 - 152)} = 760 \text{ kc.}$$

Now, let V be the velocity of the radio wave, and $\lambda$ be the wave length. Then $F = V/\lambda$ is the well-known relationship between them. Let $\lambda$, $\lambda_1$ and $\lambda_2$ represent the wave lengths corresponding to F, $F_1$ and $F_2$ respectively. Putting $V/\lambda$ for F, etc., in (3) we have $$\frac{V}{\lambda} = N \frac{\frac{V^2}{\lambda_2 \lambda_1}}{\frac{V V}{\lambda_2 \lambda_1}}$$

simplifying, $$\frac{1}{\lambda} = N \frac{1}{(\lambda_1 - \lambda_2)}$$

and $$\lambda = \frac{1}{N}(\lambda_1 - \lambda_2) \quad (4)$$

In the operation of the form shown in Figure 2 wherein the same frequency coverage is assumed as in Figure 1, 2000 meters being equivalent to 150 kilocycles and 750 meters being the same as 400 kilocycles and in which the scale is calibrated in wave lengths, the unknown wave length is found by subtracting the wave length readings corresponding to two successive response positions upon the dial of oscillator B. If other than successive response points are used, the wave length difference is divided by the number of the last response, counting the first as the zero starting point.

I have also discovered that if the oscillator calibration follows the straight line wave length law a much improved instrument will result. This would correspond to using an effective straight line wave length capacitor or inductor for the tuning element and is the equivalent of making equal wave-length increments correspond to equal angular displacements in oscillator B. This device is represented as part of Figure 3.

The preferred form of my invention is shown in Figures 3 to 5, inclusive, wherein the oscillator C is provided with a dial calibrated in wave lengths $\lambda$ or frequency F of the unknown circuit rather than in terms of oscillator frequencies as in Figures 1 and 2, the variation in oscillator frequency being in accord with the straight-line wave-length law as just described. In this form a dial or disk 26 is freely mounted on the shaft 22 intermediate the knob 23, pointer 25 and front wall of the casing 14. Normally, upon turning of the shaft 22 by the knob 23, the disk 26 remains stationary, but may be turned relative thereto for a purpose to be presently explained. The disk is provided with an outwardly extending peripheral flange 27 to facilitate grasping and turning of the disk. The front face of the disk is calibrated by a special scale 28 indicative of wave length $\lambda$ or frequency F of the unknown tuned radio circuit.

The instrument C shown in Figures 3 to 5, is used as follows: The knob 23 is turned until a response occurs in the tuned circuit, at which time the disk 26 is turned relative to the knob and shaft until the 0 mark thereon aligns with the pointer 25. The knob 23 is now turned further to the left until the next audible response occurs in the tuned circuit. At this point a reading of the dial is taken at that point in alinement with the pointer and this reading represents the wave length $\lambda$ or frequency F of the unknown tuned circuit. It might be here mentioned that with instrument C, since the response points produced by the oscillator are equi-distantly spaced relative to the rotation of the shaft 22, no matter at which response point the dial is initially set, movement of the knob to obtain the next successive response point will result in an accurate reading of the wave length or frequency of the unknown tuned circuit.

In determining the natural unknown frequency or wave length of a tuned radio circuit as above described, the pointer 25 of the oscillator C may be moved to a response point and the dial 26 turned to register 0 with the pointer, after which further movement of the pointer to the next response point will indicate the frequency or wave length of the tuned circuit. Assume that the frequency of the unknown tuned radio circuit is 6000. The knob 23 of the oscillator C is turned until a response point is reached and the dial turned to register 0 with the pointer 25. By turning the knob further to the left, the next response will occur at 6000 on the dial. However, to increase the mechanical accuracy of this reading, the knob may be turned further to the next response point or to any other one. The second response will occur at 3000, the next at 2000, the third at 1500, etc. By multiplying any of the readings of these successive response points by the corresponding number of response points from zero position, we obtain the frequency of the tuned circuit. Thus, 1500 is the fourth response point from the reading of the dial set at 0, after obtaining the first response point and $4 \times 1500 = 6000$, which checks with the original reading. If, however, the scale of the oscillator is marked off in wave lengths instead of frequencies, the scale reading from the 0 point is divided by the number of response points instead of multiplied as above explained.

In Figure 3 of the drawings, I have shown an oscillator C having a specially calibrated dial for indicating the natural frequency of any tuned radio circuit within the range of the calibrations to indicate resonance. The wave length of a tuned circuit, is given by the formula $$\lambda = K\sqrt{LC}$$

where K is a constant and L and C the inductance and capacity respectively of the circuit. This formula is true when the resistance of the circuit is sufficiently small, as is usually the case. If the capacity of a tuned circuit is known, the inductance of this circuit can be immediately determined from the value of the capacity and from the natural wave length or frequency as determined by the oscillator C. In fact, the scale of the oscillator may be directly calibrated in inductance values and for one application, make possible the easy measurement of small air core inductances at radio frequency.

In a similar manner, if a known inductance is used in the tuned circuit, the scale on the special oscillator dial may be calibrated directly in terms of capacity, thus providing a capacity meter operating at the natural frequency of the tuned radio circuit.

I can also use oscillators A and B for finding the inductance or capacity of a tuned circuit. For an oscillator calibrated in the wave lengths, as B, Figure 2, a judicious choice of inductance and units will permit writing $\lambda^2 = C$ which comes from the well known equation $\lambda = K\sqrt{LC}$, so that in this case capacity is found by merely squaring the wave length, of the unknown circuit, as determined by the calibrated oscillator. Likewise, $\lambda^2 = L$ may be used by choosing a judicious value for C.

For an oscillator calibrated in frequency, as A, Figure 1, a judicious choice of inductance and units will permit writing $$\frac{1}{F^2} = C$$

which comes from $F^2LC = K$. Likewise, we can write, for the case of inductance $$\frac{1}{F^2} = L.$$

In this case F is the frequency of the unknown circuit as determined by the frequency calibrated oscillator.

In using this method of measurement in the oscillators A, B, and C, no knowledge whatsoever is required by the user as to the order of harmonic being used, although in some cases, it may be desirable to imprint such information on the scale.

In Figure 7 of the drawings, I have shown a slight modification wherein a variable inductance 28' is employed instead of a variable condenser as above described. In this form a fixed condenser 29 is arranged in the circuit 16 with the variable inductance 28'.

In Figure 8 of the drawings, I employ both a variable inductance 30 and a variable condenser 31 ganged together in the circuit 16.

The operation of the oscillator when constructed in accordance with the modifications shown in Figures 7 and 8 operate in the same manner as above described.

While I have shown and described what I consider to be the preferred embodiments of my invention, I wish it to be understood that such changes and alterations as come within the scope of the appended claims may be resorted to if desired.

Having thus described my invention, what I claim as new and desire to secure by Letters Patent of the United States, is:

1. A radio station finder for use in connection with a tuned radio circuit to ascertain its unknown frequency consisting of an electrical instrument adapted to set up harmonic responses in a tuned radio circuit; having a rotatable actuating part, a normally stationary calibrated dial rotatably mounted relatively to said actuating part, an indicating pointer mechanically coupled with said actuating part whereby said actuating part may be tuned to a harmonic response point, and the dial set to a normal position in alinement with said indicating pointer, and the actuating part subsequently turned to the next harmonic response point of said electrical instrument.

2. In combination, a tuned radio circuit whose frequency is unknown, a variable calibrated instrument operatively associated with said circuit for setting up successive harmonic responses in said circuit upon actuation of said variable instrument, and means for determining the frequency of said circuit by any two harmonic response points of said calibrated instrument.

3. A radio station-finder for use in connection with a tuned radio circuit to ascertain its unknown frequency, and having a fundamental frequency range essentially lower than the range of the tuned circuit, comprising a dial calibrated in frequencies, and manually operable means to cause successive harmonics to be set up by the radio station-finder and adapted to produce responses in a tuned radio circuit, the said means cooperating with said dial to indicate the frequency of the tuned circuit.

4. A radio station-finder for use in connection with a tuned radio circuit to ascertain its unknown wave length and having a fundamental wave length range essentially higher than the range of the tuned circuit, comprising a dial calibrated in wave lengths, and manually operable means to cause successive harmonics to be set up by the radio station finder and adapted to produce responses in a tuned radio circuit, the said means cooperating with said dial to indicate the wave length of the tuned circuit.

5. In combination, a tuned circuit of unknown frequency, a calibrated signal-generator having a straight-line wave length characteristic, operatively associated with said tuned circuit to set up successive harmonic responses in the tuned circuit, and means for determining the frequency of the tuned circuit from any two harmonic-producing fundamental frequencies of the signal generator.

6. In combination, a tuned circuit of unknown wave length, a calibrated oscillator having a straight line wave length characteristic, operatively associated with said tuned circuit to set up successive harmonic responses in the tuned circuit, and means for determining the wave length of the tuned circuit from any two harmonic-producing fundamental frequencies of the oscillator.

7. In combination, a tuned circuit of unknown inductance and known capacitance, a calibrated signal generator having a straight line wave length characteristic operatively associated with said tuned circuit to set up successive harmonic responses in the tuned circuit, and means for determining the inductance of the tuned circuit from any two harmonic producing fundamental frequencies of the signal generator.

8. In combination, a tuned circuit of unknown capacitance and known inductance, a calibrated signal generator having a straight line wave length characteristic operatively associated with said tuned circuit to set up successive harmonic responses in the tuned circuit, and means for determining the capacitance of the tuned circuit from any two harmonic-producing fundamental frequencies of the signal generator.

EDWARD M. SHIEPE.